(12) United States Patent
Lee

(10) Patent No.: US 7,541,301 B2
(45) Date of Patent: Jun. 2, 2009

(54) COMPOSITE PAPER FOR EMBROIDERING, PRINTING, FOIL COATING AND EMBOSSING ON A SAME SURFACE

(76) Inventor: Charles Hee Lee, 1946 Kellerton Dr., Hacienda Hts., CA (US) 91746

( * ) Notice: Subject to any disclaimer, the term of this patent is extended or adjusted under 35 U.S.C. 154(b) by 590 days.

(21) Appl. No.: 11/299,554

(22) Filed: Dec. 13, 2005

(65) Prior Publication Data

US 2007/0144419 A1   Jun. 28, 2007

(51) Int. Cl.
*B32B 29/02* (2006.01)
(52) U.S. Cl. .................. 442/412; 442/149; 442/394
(58) Field of Classification Search .............. 442/412, 442/394, 149
See application file for complete search history.

(56) References Cited

U.S. PATENT DOCUMENTS

| | | | |
|---|---|---|---|
| 5,851,931 A * | 12/1998 | DeRenzo et al. | 442/62 |
| 5,854,149 A * | 12/1998 | Nagayama et al. | 442/394 |
| 6,803,110 B2 * | 10/2004 | Drees et al. | 428/423.7 |
| 7,081,300 B2 * | 7/2006 | Laurence et al. | 428/423.7 |
| 2002/0160680 A1 * | 10/2002 | Laurence et al. | 442/394 |
| 2005/0255331 A1 * | 11/2005 | Krebs et al. | 428/513 |
| 2006/0154003 A1 * | 7/2006 | Trouilhet et al. | 428/32.24 |
| 2007/0110925 A1 * | 5/2007 | Ridless | 428/32.16 |

FOREIGN PATENT DOCUMENTS

| | | | |
|---|---|---|---|
| JP | 05311564 | * | 11/1993 |
| JP | 08158239 A | * | 6/1996 |

* cited by examiner

*Primary Examiner*—Norca L Torres-Velazquez

(57) ABSTRACT

A composite paper for embroidering, printing, foil coating and embossing on a same surface is provided. The composite paper is comprised of a top layer of printable paper, a middle layer of non-woven polyester felt coated with anhydrous thermoplastic glue, and a bottom layer of paper. The three layers of materials are overlapped and pressed up to 1.5 atm at 150° C. for 5 sec to form a composite paper. The composite paper of the current application is tear resistant. It is especially useful as an embroidering substrate and useful in the manufacture of cards and packaging materials that require various decorations of printing, embossing, foil coating and embroidery on a same surface.

1 Claim, 4 Drawing Sheets

COMPOSITE PAPER FOR EMBROIDERING, PRINTING, FOIL COATING AND EMBOSSING ON A SAME SURFACE

FIELD OF THE INVENTION

This invention relates generally to a composite paper, and more particularly to a thermoplastic glue coated polyester felt reinforced composite paper enabling an embroidering on a paper surface.

BACKGROUND OF THE INVENTION

Embroidery is traditionally done on a textile with needle and threads. Paper is not used as substrates for embroidery due to its property of puncture and tears propagation. The only use of paper in embroidering process is embroidering paper, a scaled paper on which the design of embroidery is drawn. But, embroidery gives an impression of more elegant or more courteous when used in an invitation card. As of now, embroidered card is prepared by attaching an embroidered textile to a paper card frame. In this procedure, embroidering on a textile and embossing/printing paper card frame is executed in a separate process. Therefore, the process needs larger space than a simple paper card preparation process or a simple embroidering process. It is the purpose of the current application to provide a composite paper that can be used as a substrate for embroidering, printing, and embossing on the same surface. And finally used in conventional embroidering machine to produce an embroidery card directly.

DESCRIPTION OF THE PRIOR ART

U.S. Pat. No. 6,588,172 to Porter illustrates a planar, structural insulated panel for building construction includes a pair of outer facings disposed on opposed surfaces of a plastic foam core.

U.S. Pat. No. 5,525,176 to Higa illustrates crimped paper articles reinforced by rolling a piece of paper around a sleeve and pressing one end of the paper and sleeve against a hard surface.

U.S. Pat. No. 5,494,735 to Nitta illustrates a composite synthetic paper comprising (A) plain weave fabric and (B) synthetic paper comprising a stretched resin film having an opacity of not less than 85%, a void volume of from 10 to 60%, and a thickness of from 30 to 500 μm, with or without (C) opacifying layer interposed between (A) and (B), in which synthetic paper (B) may be composed of a biaxially stretched thermoplastic resin film as a base layer and a uniaxially stretched thermoplastic film containing 8 to 65% by weight of an inorganic fine powder as a paper-like layer.

U.S. Pat. No. 5,401,557 to Inomata, et al. illustrates a thread-reinforced paper sheet comprises upper and lower paper layers and a reinforcing thread interposed there between.

U.S. Pat. No. 5,161,829 to Detrick, et al. illustrates a security paper includes at least two layers of paper each having inner and outer surfaces and predetermined mechanical properties, color and optical density.

U.S. Pat. No. 4,946,372 to Avni illustrates a composite paper which is comprised of a paper substrate, a continuous thermoplastic film formed on at least one surface of the paper substrate, and a layer of an ink absorbent composite bonded to the outer surface of the thermoplastic film.

U.S. Pat. No. 4,945,952 to Vohringer illustrates a composite paper making wire (a generic term for a paper making fabric) as a sheet forming part of a paper-making machine includes an upper fabric layer and a lower fabric layer which are interconnected by longitudinally directed or cross directed connecting yarns of synthetic material.

U.S. Pat. No. 4,863,537 to Sadri illustrates a method of tracing graphic material present on an underlying substrate onto an overlying tracing paper.

U.S. Pat. No. 4,731,276 to Manning, et al. illustrates a method of making a quilted cloth-like composite laminate.

U.S. Pat. No. 4,726,977 to Goldstein, et al. illustrates a laminated web for use as a roll towel comprises a sheet of plastics scrim 2 between two layers of tissue paper 1.

U.S. Pat. No. 4,053,339 to Story, et al. illustrates a composite dry process hardboard includes a hardboard panel consisting of pressed defibrated and refined wood chips, plus a surface layer of paper cemented to the hardboard by a cured resin made from phenolic resin mixed with water and ethylene glycol.

None of the prior art illustrates a composite paper strong enough to do embroidery thereon and enabling various decoration of printing, embossing, foil coating and embroidery on a same surface.

SUMMARY OF THE INVENTION

Embroidery is traditionally done on a textile with needle and threads. Papers are not used as substrates for embroidery due to its property of puncture and tear propagation. The only use of paper in embroidering process is embroidering paper, a scaled paper on which the design of embroidery is drawn. But, embroidery gives an impression of more elegant or more courteous when used in an invitation card. As of now, an embroidered card is prepared by attaching an embroidered textile to a paper card frame. In this procedure, embroidering on a textile and embossing/printing paper card frame is executed in a separate process. Therefore, the process needs larger space than a simple paper card preparation process and a simple embroidering process. It is the purpose of the current application to provide a composite paper that can be used as a substrate for embroidering. And finally used in conventional embroidering machine to produce an embroidery card. A composite paper for such purpose is provided. The composite paper is comprised of a printable paper substrate, a nonwoven polyester felt coated with anhydrous thermoplastic glue, and a paper substrate. The three layers of materials are overlapped and pressed up to 1.5 atm at 150° C. for 5 sec to form a composite paper. The composite paper of the current application is tear resistant. It is especially useful as a substrate for embroidering, printing and embossing on a same surface. Cards for greetings and invitation are the best example.

DETAILED DESCRIPTION OF PREFERRED EMBODIMENT

Figure 1:
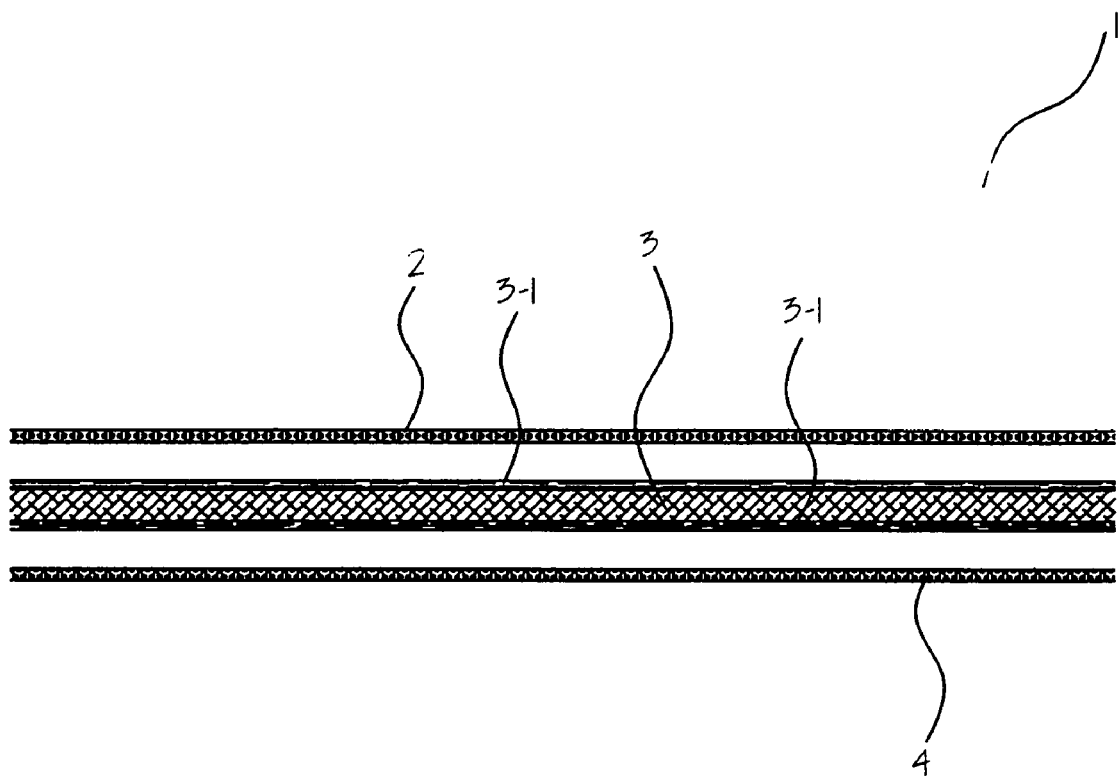
FIG. 1 is a cross-sectional view of the composite paper of the current application.

FIG. 1 is a cross-sectional view of the composite paper (1) of the current application. The composite paper (1) comprised of a top layer (2) of printable paper of color copy paper from Corporate Office product number 1058A, a middle layer (3) of machine cut non-woven polyester felt, coated with anhydrous thermoplastic glue (3-1), from Kunin Rainbow™, and a bottom layer (4) of the same copy paper used for the top layer (2). The three layers of materials are overlapped and pressed up to 1.5 atm at 150° C. for 5 sec to form a composite paper. The plastic glue on the non-woven polyester felt adheres the felt and the papers on both sides strongly. The polyester felt structure renders tear resistance to the adhered papers on both sides thereof.

The strong point of the composite paper of the current application is that embroidering thereon is as easy as conventional fabrics.

Figure 2:
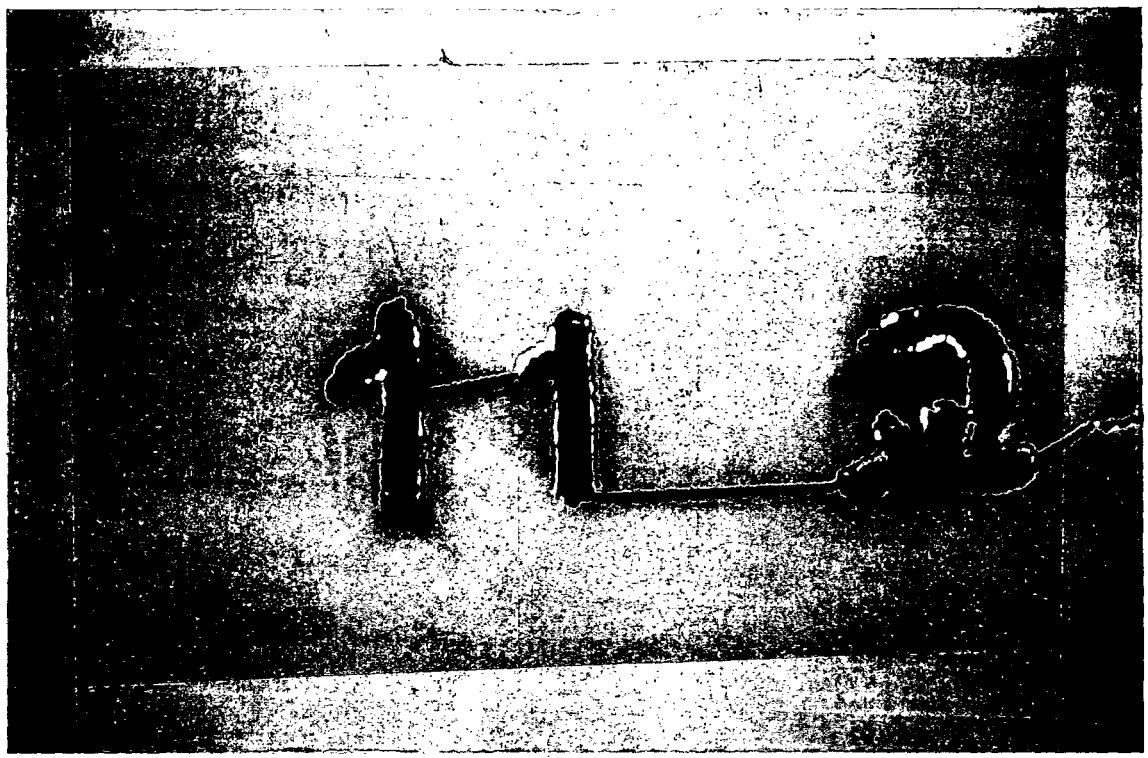
FIG. 2 is a photograph of a surface of a conventional card paper, 0.3 mm thickness, embroidered with threads.

FIG. 2 is a photograph of a conventional card paper of 0.3 mm thickness embroidered with threads. For comparison, the number '11' was threaded on a conventional card paper. The photograph of FIG. 2 was taken by placing the conventional card paper, embroidered, on a light source of electric lamp. As shown in the photograph, white spaces are developed along the brim of the embroidery, the number '11'. Those white spaces are developed by the light from the electric lamp placed behind of the conventional card paper embroidered. The conventional card paper is easily torn out by the puncturing force of a sewing machine's needle. It is very hard to hold the embroidery on the paper due to the torn-outs, white parts, developed along the embroidery.

Figure 3:
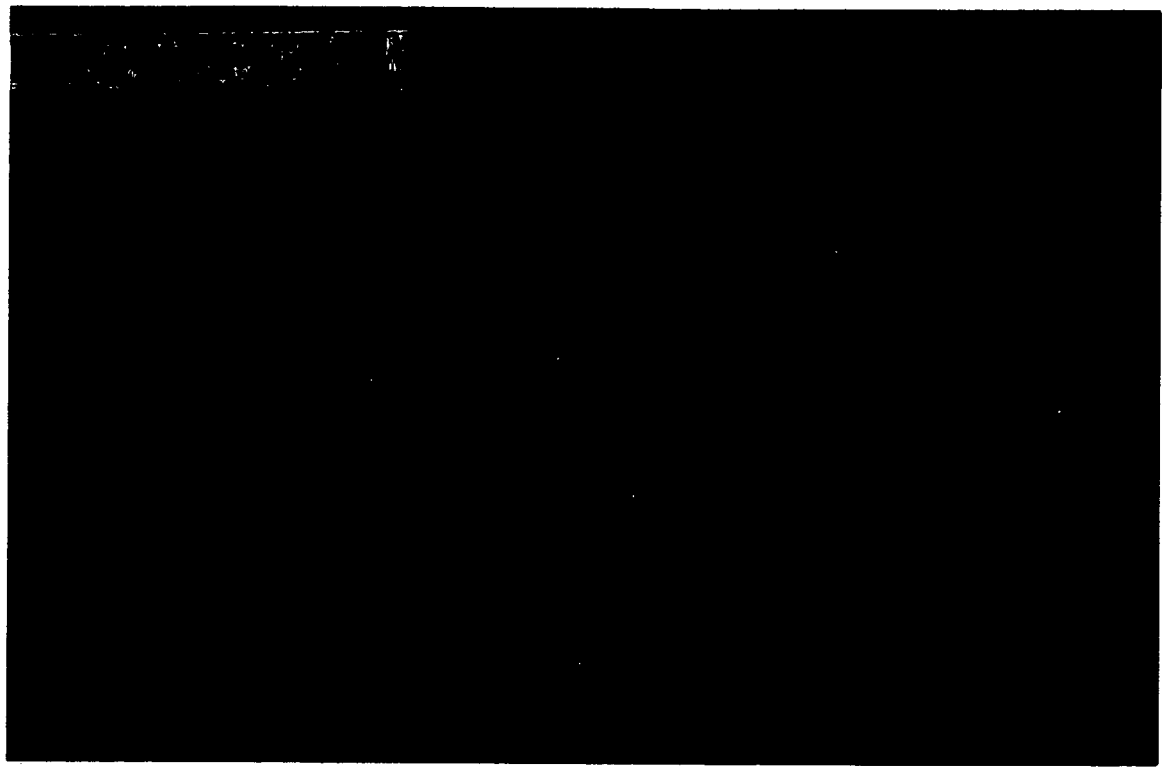
FIG. 3 is a photograph of a surface of an embroidered composite paper, 0.3 mm thickness, of the current application.

FIG. 3 is a photograph of a surface of an embroidered composite paper (1), 0.3 mm thickness, of the current application. Size of the needle, the speed of sewing, and number of puncture per centimeter are the same for both of the FIGS. 2 and 3. Photograph of FIG. 3 was taken by the same method as the FIG. 2. But, no torn-outs, white spaces that are observed in FIG. 2, are found along the embroidery on the composite paper (1) of the current application. Printing, foil coating, embossing are applied on the same surface of the top layer (2), which is already embroidered.

Figure 4:
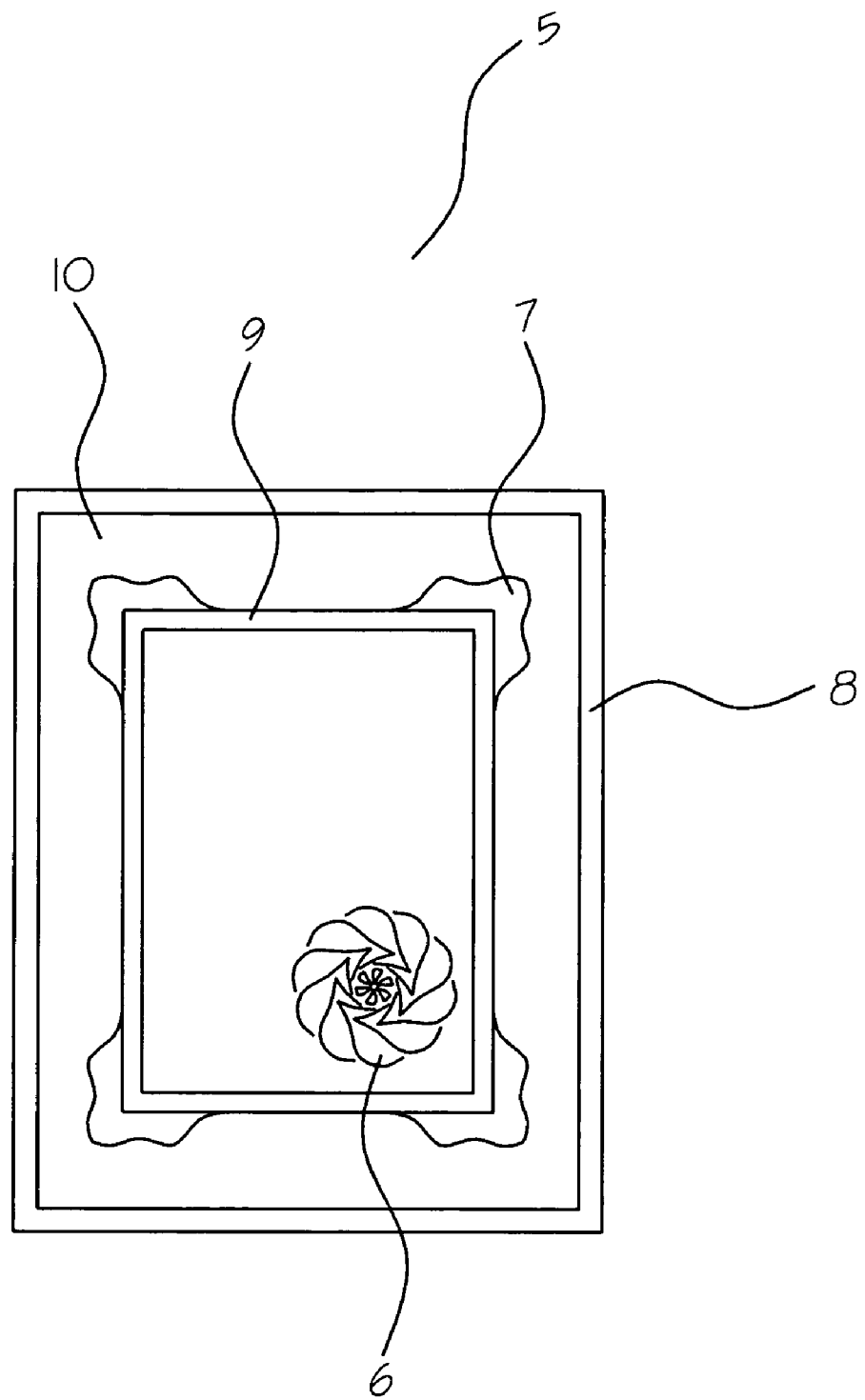
FIG. 4 is a surface of a card having a surface decorated with embroidery, printing, and embossing on a same surface.

FIG. 4 is a surface of a card (5) having a surface decorated with embroidery (6), printing (7), foil coating (8) and embossing (9) on a same surface (10). As shown in the FIG. 4, the composite paper (1) of the current application is applied to an embroidery card, envelop, packaging bag, notebook cover page, book binder, etc. Continuous production of the composite paper of the current application is easily imaginable for experienced personnel of this field of endeavor.

What is claimed is:

1. A composite paper for embroidering, printing, foil coating and embossing on a same surface is comprised of;
   a top layer of printable paper of color copy paper, and
   a middle layer of machine cut non-woven polyester felt coated with anhydrous thermoplastic glue, and
   a bottom layer of the same copy paper used for the top layer which are overlapped and pressed up to 1.5 atm at 150 C. for 5 seconds to form a composite paper.

* * * * *